United States Patent [19]

Reno, Jr. et al.

[11] 4,388,642

[45] Jun. 14, 1983

[54] HEAT SINKING MEANS AND METHOD FOR PROJECTION TELEVISION CRTS

[75] Inventors: James J. Reno, Jr., Schaumburg; Richard G. Schmid, Glenview, both of Ill.

[73] Assignee: Zenith Radio Corporation, Glenview, Ill.

[21] Appl. No.: 280,398

[22] Filed: Jul. 6, 1981

[51] Int. Cl.³ .............................................. H04N 9/31
[52] U.S. Cl. .................................... 358/60; 358/229; 358/237; 358/254
[58] Field of Search ................. 358/60, 217, 229, 231, 358/237, 254

[56] References Cited

U.S. PATENT DOCUMENTS

| | | | |
|---|---|---|---|
| 3,141,987 | 7/1964 | Altman | 358/229 |
| 3,715,491 | 2/1973 | Finch | 358/217 |
| 4,151,554 | 4/1979 | Tucker | 358/60 |

*Primary Examiner*—Richard Murray

[57] ABSTRACT

Heat sink means for a projection television cathode ray picture are disclosed. The tube has a face plate on the inner surface of which is deposited a cathodoluminescent screen for forming a television image. The face plate develops an undesirably high temperature during operation resulting in cracking. The heat sink means according to the invention comprises a heat-conductive panel, which may be a metallic plate, larger in area than the face panel. The panel has a window for passing the television image. The panel is in intimate contact with the face plate for conducting heat from the face plate and inhibiting thermal cracking.

6 Claims, 8 Drawing Figures

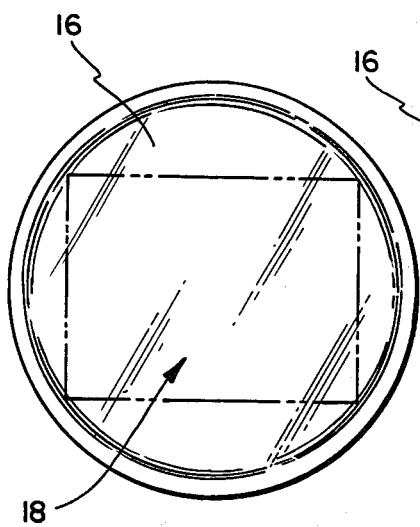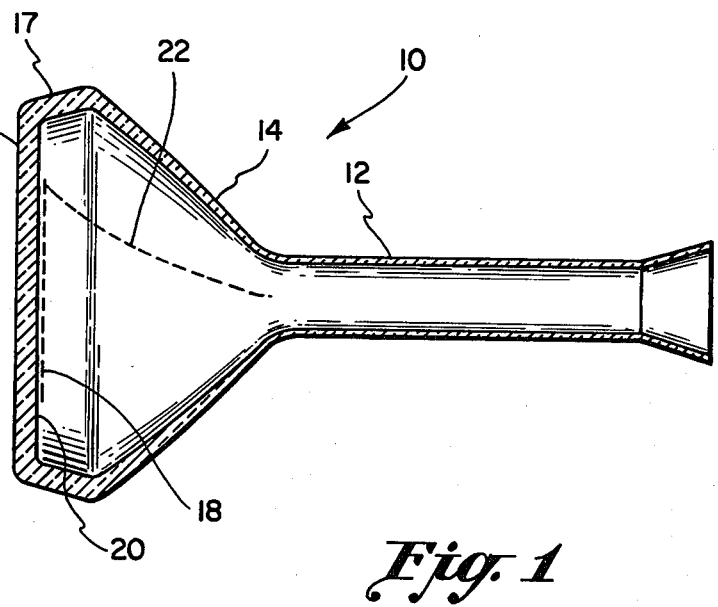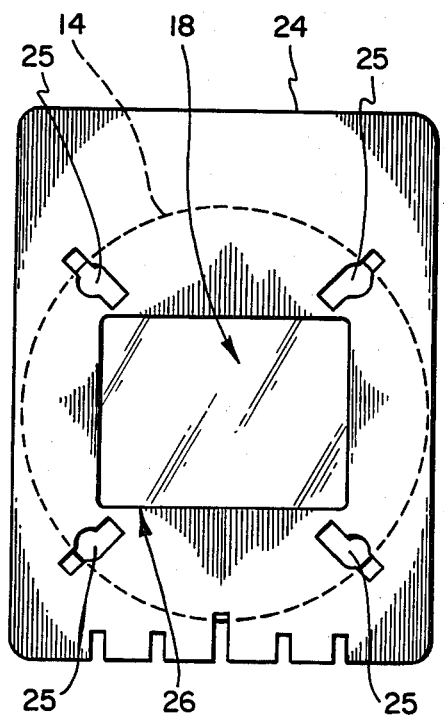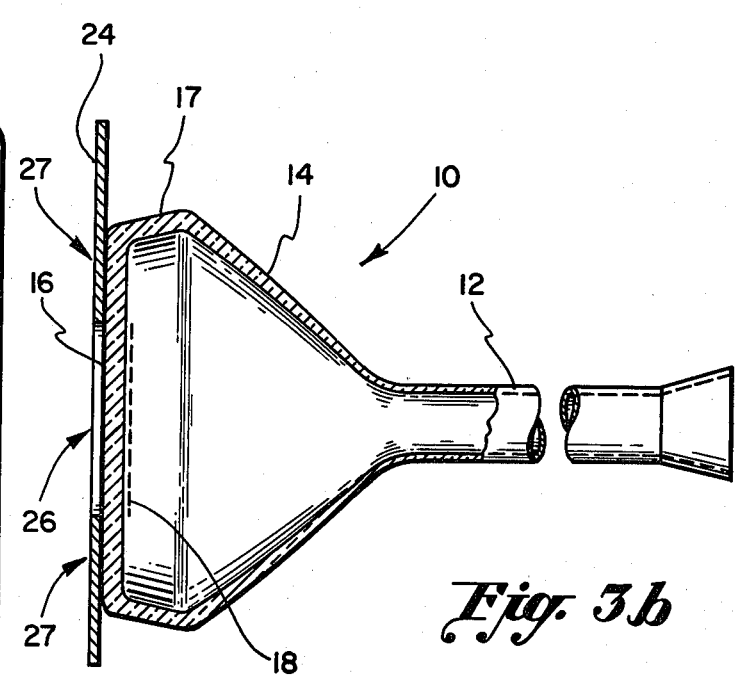

HEAT SINKING MEANS AND METHOD FOR PROJECTION TELEVISION CRTS

CROSS-REFERENCE TO RELATED APPLICATIONS

This application is related to, but in no way dependent upon copending applications of common ownership herewith, including: application Ser. No. 314,591 filed Oct. 26, 1981; and application Ser. No. 318,309 filed Nov. 5, 1981.

BACKGROUND OF THE INVENTION

This invention relates to cathode ray picture tubes used in projection television systems, and is particularly concerned with means and method for optimizing the performance of such tubes.

Projection television systems typically include at least one cathode ray picture tube having a cathodoluminescent screen on the inside surface of the face panel. Electron-beam generating means disposed on the cathode ray tube electron-optical axis provide for forming an electron image on the cathodoluminescent screen. This electron image is converted to a visible image by the screen. Projection lens means on the projection optical axis of the tube provide for projecting the aerial image of the visible image onto a viewing screen whereon the viewer sees the television picture. The viewing screen may be of the front-projection type, or a rear projection type wherein the aerial image is projected onto the side of the screen opposite the viewer. To provide for compactness of the projection system, the path of the aerial image is normally "folded" by means of one or more mirrors.

Projection television systems may have a bank of red, green and blue image source means including three cathode ray picture tubes each with an associated projection lens for projecting into coincidence a red, green, and blue image to form a composite color image on the viewing screen.

A desirable—indeed necessary—feature of a projection television system is the ability to project an image of adequate brightness on the viewing screen. Brightness, desirably, should equal that of the shadow mask color picture tube which provides an average brightness of 80 foot-Lamberts at a beam current of 1.5 milliamperes, with a peak brightness potential of about 320 foot-Lamberts. In view of the relatively long projection path and consequent effect of the inverse-square law, this brightness objective has proved difficult to achieve in projection television systems.

The face panel of a cathode ray picture tube used in projection television systems is typically circular, with a diameter of about six inches. The visible image that is electron-formed on the cathodoluminescent screen on the inner surface of the face plate is a rectangle of three to four aspect ratio. To provide a projected image of four feet in diagonal measure having a brightness of eighty foot-Lamberts, for example, the brightness of the image on the cathodoluminescent screen must be in the range of six thousand to seven thousand foot-Lamberts.

An undesired byproduct of image brightness of this magnitude is the undesirably high temperatures which are developed in the envelope, especially in the face plate area, as a result of the electron bombardment of the face plate. For example, the operating temperature of the face plate may vary between 80 degrees Centigrade and 90 degrees Centigrade with 80 degrees Centigrade being considered a practical maximum. As the cathode ray tube envelope is made of glass, the envelope is prone to thermal cracking, especially in the area of the imaging screen of the face plate.

One way to obviate the thermal cracking tendency is to reduce the power consumption of the cathode ray tube from about sixteen watts, for example, which provides a projected picture of acceptable brightness, to about eight watts, wherein the projected picture becomes of marginally acceptable brightness. This obviously self-defeating measure has proved necessary in some prior art projection systems to provide acceptable reliability.

So a major factor in limiting the brightness of a projection television system is the thermally induced cracking of the CRT face plate. Another factor is the need to make the glass of the face plate thicker to provide greater crack resistance, whereupon the thicker glass appreciably reduces light transmission and thus makes for a less bright image.

Even if the face plate does not crack as a result of heat, the high temperatures concentrated in the small imaging area can produce other undesirable results. For example, high temperatures coupled with electron bombardment over a period of time can cause the glass to discolor, which in turn can degrade the color purity of the projected image. Another deleterious effect of high face plate temperature is exerted on the associated projection lens, which is normally located closely adjacent to the face plate. The composition of such lenses is usually a plastic which provides light weight and lower costs; however, the plastic is heat deformable. If the face plate temperature reaches 100 degrees Centigrade, however, the plastic may deform and destroy the lens.

OBJECTS OF THE INVENTION

It is a general object of this invention to provide means and method for implementing the brightness of the projected image of projection television systems.

It is a less general object of this invention to provide for reducing the operating temperature of face plates of cathode ray tubes used in projection systems.

It is a more specific object of the invention to provide for making possible the use of plastic projection lenses in projection television systems.

It is a specific object of the invention to provide for a maximum face plate operating temperature of approximately 80 degrees Centigrade.

It is another specific object of the invention to provide for making possible the use of thinner glass in the face plates of projection cathode ray tubes.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 1 is a sectioned side view in elevation of a cathode ray picture tube for a projection television system;

FIG. 2 is a view in elevation of the face plate of the tube shown by FIG. 1;

FIG. 3A is a view of the face plate shown by FIG. 2 with the heat sink means according to the invention installed;

FIG. 3B is a side elevational view of the assembly shown by FIG. 3A;

DESCRIPTION OF THE PREFERRED EMBODIMENT

Figure 4:
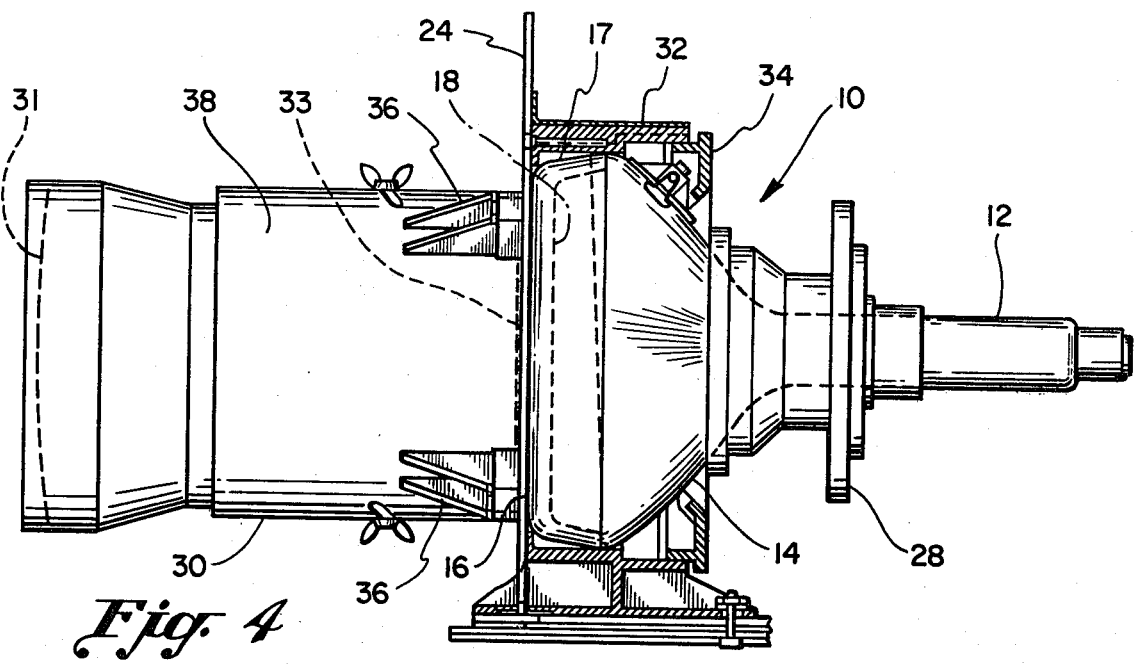
FIG. 4 is a side view in elevation of a cathode ray tube, projection lens, support means (in section), and heat sink means according to the invention, as assembled.

FIGS. 1 and 2 depict components of the glass envelope of a cathode ray tube 10 for a projection television system. Tube 10 consists essentially of a neck 12, a funnel 14, and a face plate 16 having a rearwardly extending flange 17. Face plate 16 is indicated as having deposited thereon a cathodoluminescent screen 18 on the inner surface thereof for forming a television image. The cathodoluminescent screen 18 is depicted as having an aspect ratio of three to four, and its dimensions are preferably about three inches by four inches, as well, providing a picture imaging area with a diagonal measure of five inches. The tube depicted is a projection television tube of the type described and claimed in U.S. Pat. No. 4,274,210, of common ownership herewith.

(The screen 18 is indicated as comprising only a part of the inner surface 20 of face plate 16; in actuality, the cathodoluminescent phosphor coating covers the entire inner surface 20 of face plate 16 as a result of the manufacturing process, and the screen 18 is delineated primarily by the scanning electron beam 22, which is indicated highly schematically.)

Face panel 16 is subject to thermally-induced cracking due to the undesirably high temperatures developed in the face plate under the electron bombardment of beam 22 during operation of the projection system. The means according to the invention for inhibiting such cracking comprises a vertically oriented rectangular heat-conductive panel 24, as depicted by FIGS. 3A and 3B. Heat-conductive panel 24, which is preferably made from a metallic sheet, desirably a soft-temper, black-anodized aluminum sheet about one-eighth inch thick, is depicted as being larger in area than face plate 16. Panel 24 is also shown as having a window 26 formed therein that substantially conforms in area to the area of screen 18, noted as being three inches by four inches. The window 26 is in coincidence with the screen 18 for passing the television image. Heat conductive panel 24 is also indicated as being in intimate contact with face plate 16 in the areas 27 of face plate 16 which are outside the area of screen 18. Heat-conductive panel 24 according to the invention is effective to conduct heat generated under electron bombardment from face plate 16, thus providing for the inhibiting of thermally induced cracking of face panel 16. The effect is such as to reduce face plate operating temperature by at least 10 degrees Centigrade. Apertures 25 provide for mounting the heat sink means according to the invention, as will be shown. The notches depicted at the bottom of panel 24 in FIG. 3A have a similar function.

Figure 5:
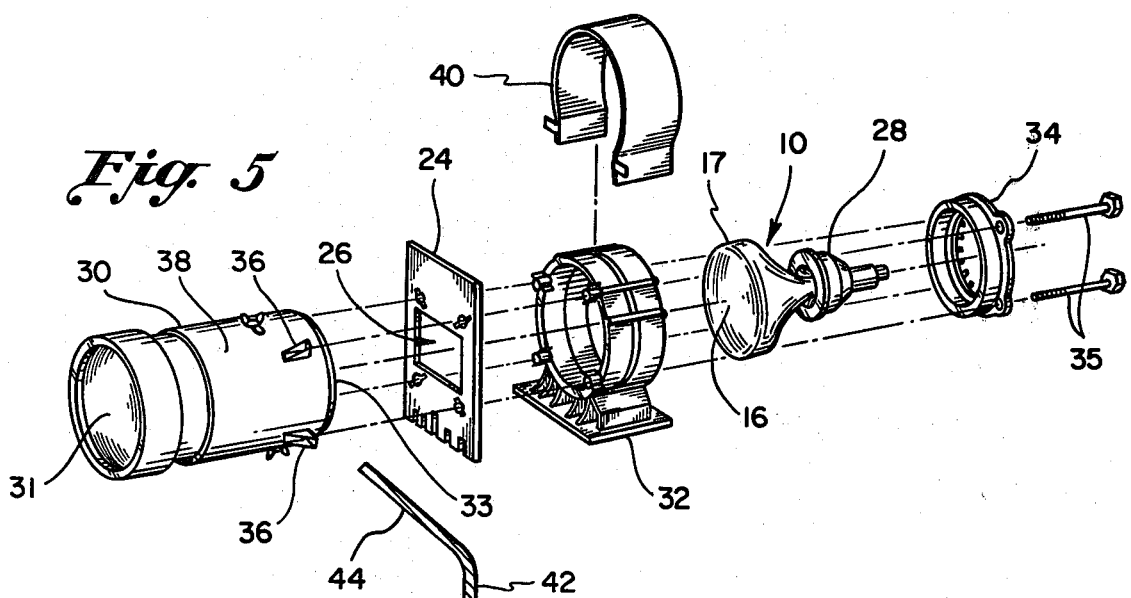
FIG. 5 is an exploded view of basic components shown by FIG. 4.

A preferred means of mounting heat conductive panel 24 in proper relationship to face plate 16 of cathode ray tube 10, is shown by FIGS. 4 and 5. A deflection yoke 28 provides for scanning the electron beam 22. The associated projection lens 30 has a front face 31 and a rear face 33 closely adjacent to the associated face plate 16. The lenses, of which the front and rear faces 31 and 33 are indicated, are composed of a plastic that is heat-deformable. The temperature of the face plate 16 is particularly critical since it is located about 0.10 inch from the heat-deformable rear face 33 of projection lens 30.

The face plate 16 and flange 17 of tube 10 are depicted as being cradled by a pod 32 shown in section. Tube 10 is firmly retained in pod 32 by holding ring 34 also shown in section; pressure against funnel 14 of tube 10 by holding ring 34 is maintained by four machine screws, or studs 35, two of which are depicted, which pass through apertures 25. Projection lens 30 is attached to pod 32 by a plurality of bracket means 36 which are indicated as grasping the barrel 38 of lens 30. Bracket means 36 have threaded perforations for receiving machine screws 35 which, when tightened, bind the whole assembly together. This mounting means is the subject of referent copending application Ser. No. 318,309 and is fully described and claimed thereon.

It will be noted that heat conductive panel 24 is placed into intimate contact with face plate 16 by its being sandwiched between the barrel of projection lens 30 and face plate 16, with panel 24 oriented to provide coincidence of window 26 and cathodoluminescent screen 18.

Figure 6:
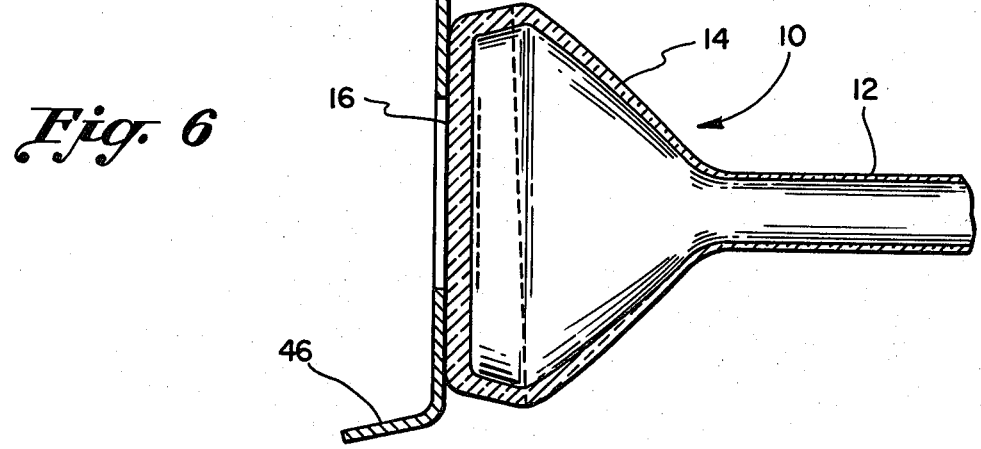
FIG. 6 is a sectioned side view in elevation of a cathode ray picture tube in association with another embodiment of the heat sink means according to the invention.

Another configuration of a heat-conductive panel according to the invention is depicted in FIG. 6, along with an associated picture tube 10. Heat conductive panel 42 is depicted as being rectangular and vertically oriented, and indicated as being larger in area and of somewhat different configuration than the heat-conductive panel 24 shown by FIGS. 3A and 3B. The larger area provides a heat sink of greater capacity necessary for a tube requiring a higher beam current. For example, the larger heat-conductive panel 42 may be required for the cathode ray tube providing the green image, which normally has a relatively higher beam current, while the smaller-area panel 24 may be used for each of the lower beam current cathode ray tubes providing the red and blue images. At least one bent end section may be provided; end sections 44 and 46 of heat-conductive panel 42 are depicted as being bent in this embodiment to provide clearance for adjacent components, or alternatively, to more readily intercept an air stream from a blower, for example.

Figure 7:
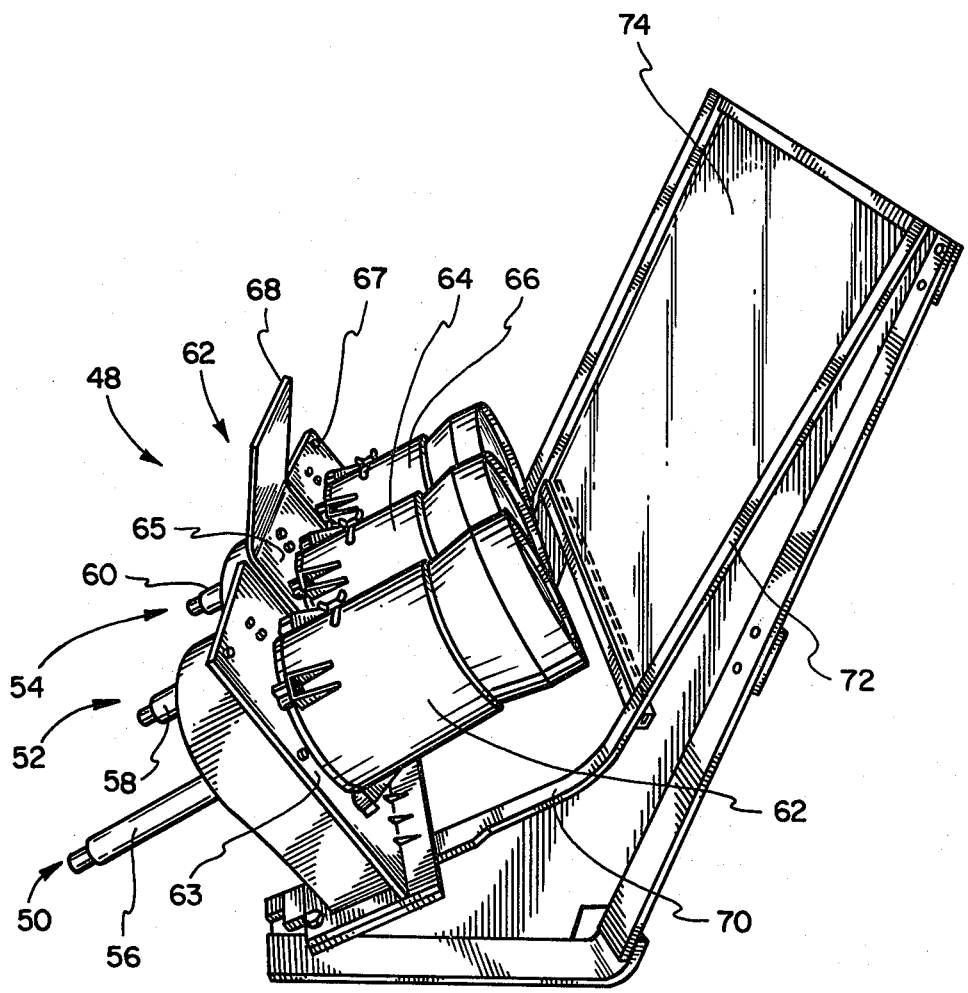
FIG. 7 is a view in perspective of a bank of television image source means having the heat sink means according to the invention.

FIG. 7 depicts a bank 48 of red, green and blue image source means 50, 52 and 54, respectively, for use in a projection television system. The image source means 50, 52 and 54 include cathode ray picture tubes 56, 58 and 60, of which only the necks can be discerned. Associated projection lens means 62, 64 and 66 provide for projecting into coincidence the red, green and blue image to form a composite color image of a viewing screen (not shown) of the projection television system.

The image source means 52 that project the green image develops a relatively higher temperature. To conduct the greater heat from the face plate of cathode ray picture tube 58, which develops the green image, the metallic panel 65, which is of the type depicted in FIG. 6, is indicated as being larger in area than the heat-conductive panels 63 and 67 for the red and blue image source means 50 and 54. Further, metallic panels 63 and 67 for the red and blue image source means 50 and 54 as depicted as being substantially flat, while the panel 65 of green image source means is shown as having at least one bent end section 68.

The bank 48 of image source means is indicated as being mounted on first platform 70 oriented as an upward projection angle. Second platform 72 is shown as being oriented at a steeply upward angle for mounting mirror means 74. This optical assembly is fully described and claimed in referent copending application Ser. No. 314,591.

Exemplary dimensions—heighth (H) and width (W)—of the preferred embodiments of the heat sink means according to the invention are listed as follows. It is to be recognized that the values are by way of example only, and are intended to be in no way limiting. Dimensional values are in inches unless otherwise noted. Changes in dimensions and configurations will no doubt occur to those skilled in the art—changes which are yet within the scope and compass of the invention.

Heat-conductive panel (24)
   Over-all: 9H×7W
   Window (26) 3.08H×4.08W
   Thickness: 0.090
Heat-conductive panel (42)
   Over-all, including bends: 11H×7W
   Window: 3.08H×4.08W
   Thickness: 0.090
   End section (44) bend: 60 degrees
   End section (46) bend: 80 degrees While particular embodiments of the invention have been shown and described, it will be obvious to those skilled in the art that changes and modifications may be made without departing from the invention in its broader aspects, and therefore, the aim of the appended claims is to cover all such changes and modifications as fall within the true spirit and scope of the invention.

We claim:

1. A dry heat sink assembly for use in a projection television system, said system having television image source means including at least one cathode ray picture tube having a glass face plate on the inner surface of which is deposited a cathodoluminescent screen for forming a television image, said face plate developing an undesirably high temperature during operation resulting in thermal cracking, said image source means further including plastic projection lens means having a front face and a heat-deformable rear face disposed closely adjacent to said face plate, said projection lens means providing for projecting an aerial image of said television image a predetermined projection distance onto a viewing screen of said system, said heat-sink assembly comprising:

a metallic heat-conductive panel having a large area relative to the area of said face plate and having vertically extending extremities, said panel being located between said face plate and said rear face of said projection lens means in intimate contact with said face plate and in close proximity to said heat-deformable rear face of said lens means, said panel having a window therein in coincidence with said cathodoluminescent screen for passing said television image to said screen;

and means for maintaining said heat-conductive panel in intimate contact with said face plate and with said panel extremities extending beyond the perimeter of said face plate so that said heat-conductive panel, solely, by conduction and radiation and without reliance upon ancillary cooling apparatus conducts heat from said face plate to inhibit said thermal cracking of said face plate, and to inhibit deforming of said heat-deformable rear face of said projection lens means.

2. The heat sink defined by claim 1 wherein said metallic panel is a substantially flat rectangular panel.

3. The heat sink defined by claim 1 wherein said metallic panel has at least one bend end section.

4. A dry heat sink assembly for use in a projection television system having red, green, and blue television image source means including three cathode ray picture tubes each with an associated projection lens means for projecting into coincidence respective red, green, and blue images to form a composite color image on a viewing screen of said system, each tube having a glass face plate on the inner surface of which is deposited a cathodoluminescent screen for forming one of said television images, each of said face plates developing an undesirably high temperature during operation resulting in thermal cracking, with said tube forming said green image developing a higher faceplate temperature than said other two tubes, each of said projection lens means having a front face and a heat-deformable rear face disposed closely adjacent to the face plate of said tube associated therewith, said heat sink assembly comprising:

a rectangular metallic heat-conductive panel located between each of said face plates and said rear face of the associated projection lens means and in intimate contact with said face plate and in close proximity to said heat-deformable rear face of said associated lens means, each of said panels having a large area relative to the area of the face plate associated therewith and having vertically extending extremities, each of said panels having a window therein in coincidence with its associated cathodoluminescent screen for passing the television image to said screen;

and means for maintaining each of said heat-conductive panels in intimate contact with said associated face plate and with said panel extremities extending beyond the perimeter of said associated face plate so that each of said heat-conductive panels, solely, by conduction and radiation and without reliance upon ancillary cooling apparatus conducts heat from its associated face plate to inhibit thermal cracking of said associated face plate, and to inhibit deforming of said heat-deformable rear face of said associated projection lens.

5. The heat sink assembly defined by claim 4 wherein the metallic heat-conductive panel for said green television image forming tube is larger in area than said panels for said red and blue image forming tubes.

6. The heat sink assembly defined by claim 4 wherein the metallic heat-conductive panels of said red and blue image forming tubes are substantially flat, and the heat-conductive panel of said green image forming tube has at least one bent end section.

* * * * *